United States Patent [19]
Tomic et al.

[11] Patent Number: 5,425,911
[45] Date of Patent: Jun. 20, 1995

[54] METHOD FOR MANUFACTURE OF INTEGRAL RECLOSABLE BAG

[75] Inventors: Mladomir Tomic; Wayne M. Wegner, both of Appleton, Wis.

[73] Assignee: Reynolds Consumer Products Inc., Appleton, Wis.

[21] Appl. No.: 139,179

[22] Filed: Oct. 21, 1993

Related U.S. Application Data

[60] Division of Ser. No. 21,967, Feb. 24, 1993, Pat. No. 5,284,430, which is a continuation-in-part of Ser. No. 750,348, Aug. 27, 1991, abandoned.

[51] Int. Cl.⁶ .................... B29C 47/06; B29C 47/16
[52] U.S. Cl. .......................... 264/171; 156/66; 156/244.11; 156/244.25; 264/177.10; 264/177.16
[58] Field of Search ......... 264/177.10, 177.16–177.20, 264/171, 216; 425/131.1, 133.5, 462.381, 466.461, 382.4, 224; 156/66, 244.11, 244.25

[56] References Cited

U.S. PATENT DOCUMENTS

| 3,579,730 | 5/1971 | Ausnit | 425/131.1 |
| 3,680,997 | 8/1972 | Dukert et al. | 425/381 |
| 3,761,211 | 9/1973 | Parkinson | 425/133.5 |
| 3,815,637 | 6/1974 | Carrow | 425/382.4 |
| 3,940,221 | 2/1976 | Nissel | 425/141 |
| 4,295,919 | 10/1981 | Sutrina | 156/500 |
| 4,515,647 | 5/1985 | Behr | 156/244.25 |
| 4,533,308 | 8/1985 | Cloeren | 425/133.5 |
| 4,536,362 | 8/1985 | Donaldson | 264/171 |
| 4,669,965 | 6/1987 | Murakami | 425/133.5 |
| 4,695,236 | 9/1987 | Predohl et al. | 425/133.5 |
| 4,822,539 | 4/1989 | Tilman et al. | 156/244.25 |
| 4,985,192 | 1/1991 | Roeder et al. | 156/66 |
| 5,053,091 | 10/1991 | Giliam et al. | 264/237 |
| 5,066,444 | 11/1991 | Behr | 156/66 |
| 5,252,281 | 10/1993 | Kettner | 156/66 |
| 5,273,595 | 12/1993 | Tomic et al. | 156/66 |

FOREIGN PATENT DOCUMENTS

| 51-43054 | 11/1976 | Japan | 264/177.17 |
| 57-61542 | 4/1982 | Japan | 425/461 |
| 2-52727 | 2/1990 | Japan | 425/133.5 |

Primary Examiner—Jeffrey R. Thurlow
Attorney, Agent, or Firm—Alan T. McDonald

[57] ABSTRACT

A method of forming a plastic film with at least one closure element utilizes a die having a removable lower die lip with grooves in the shape of the closure elements and a choker bar located in the manifold of the die to control the amount of extrudate to the grooves.

7 Claims, 8 Drawing Sheets

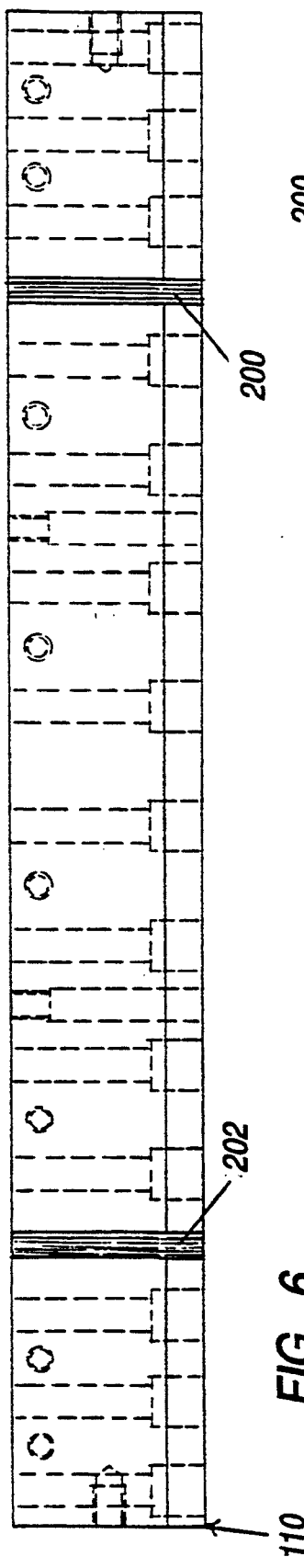
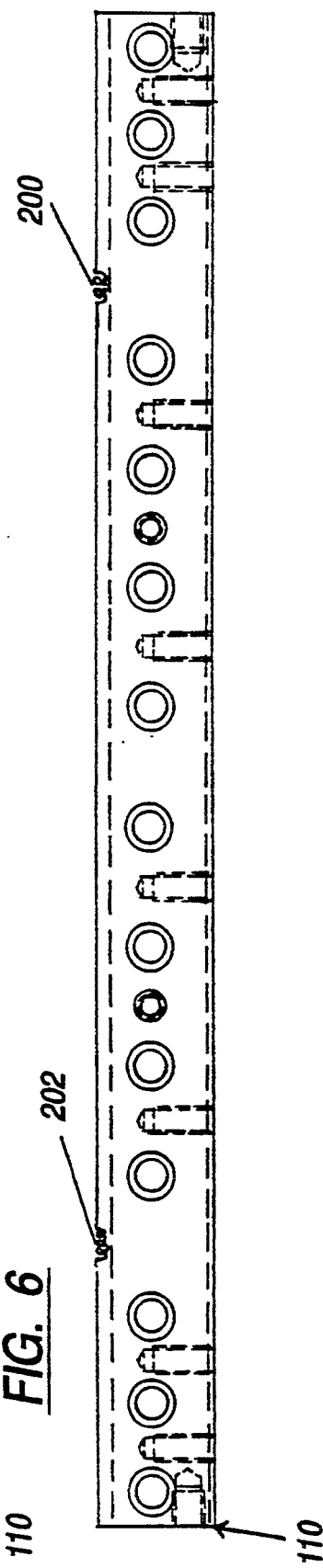
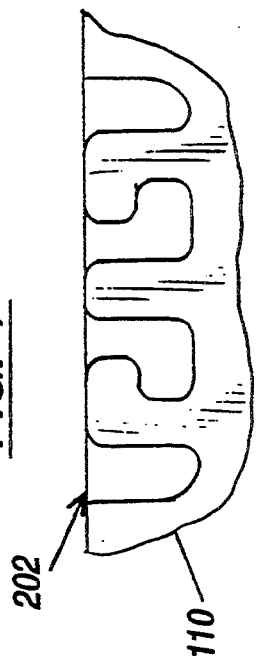
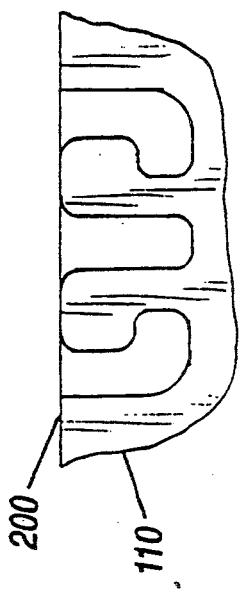

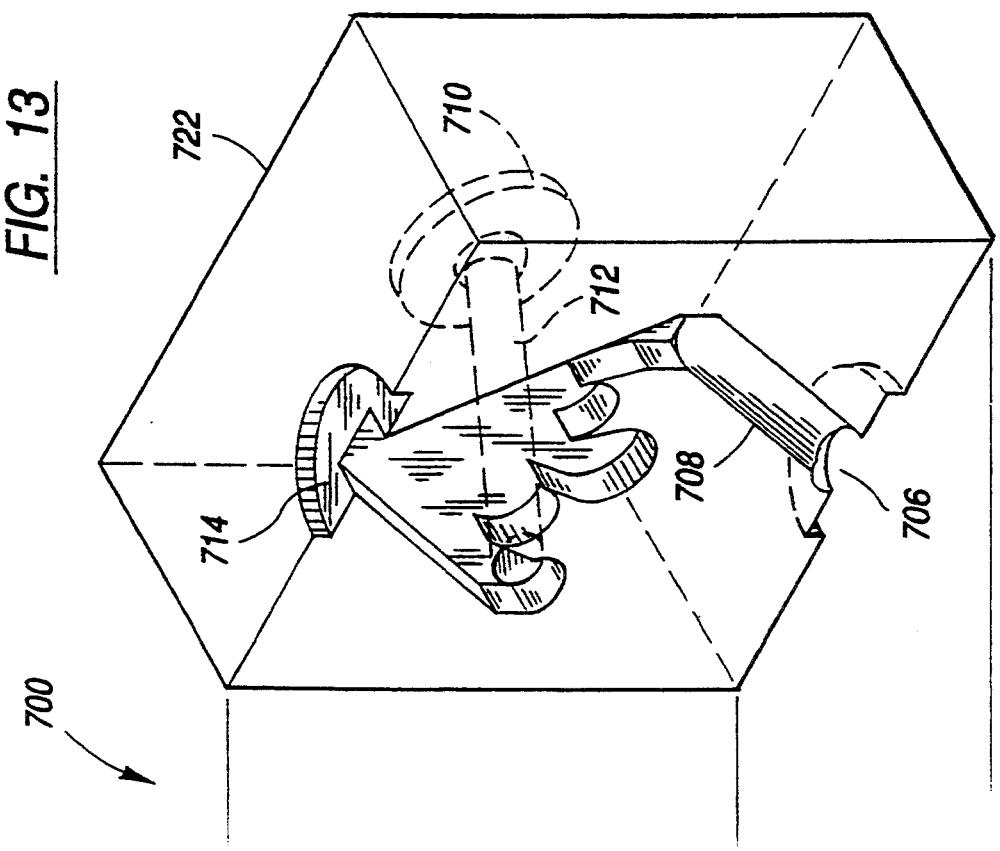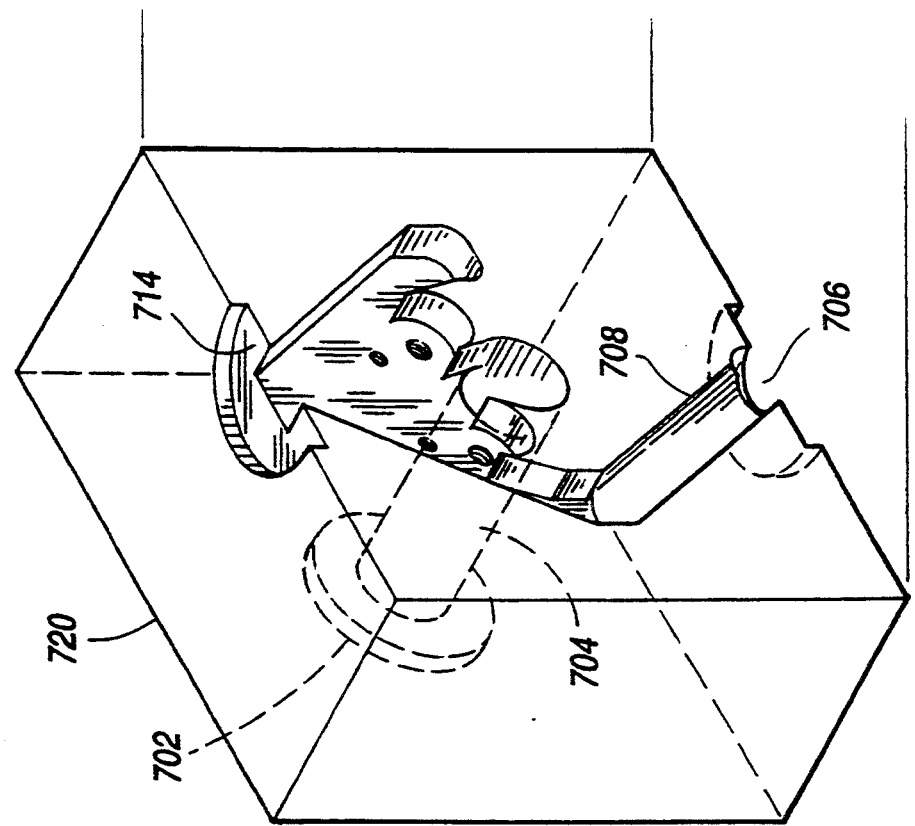
FIG. 13

METHOD FOR MANUFACTURE OF INTEGRAL RECLOSABLE BAG

The present application is a division of U.S. patent application Ser. No. 08/021967 filed Feb. 24, 1993, now U.S. Pat. No. 5,284,430, which is a continuation-in-part of U.S. patent application Ser. No. 07/750348 filed Aug. 27, 1991, now abandoned.

BACKGROUND OF THE INVENTION

This invention relates to reclosable plastic bags and an apparatus used to integrally extrude closure elements with a plastic film so that the film can be formed into reclosable bags. More particularly, the invention relates to an apparatus used to integrally extrude closure elements with films of varying thickness and other structures.

Plastic films formed into bags having reclosable closure elements located at the top of the bag are well known. Two basically different approaches are used to manufacture films having these closure elements. In the first approach, the closure elements are extruded as strips and are later attached to the film by heat or by other means of adhesion. This approach, however, requires a separate inventory of the film and the closure elements, together with additional equipment to adhere the elements to the film.

The second approach is to extrude the elements simultaneously with the film. In this approach, either a blown film process or a cast die process is used. Typically, in the blown film process, the film and closure elements are extruded from a single annular die head to form a tubular film. One difficulty with the blown film process is maintaining certain critical features of the closure elements. Because the film can be stretched longitudinally and laterally, the closure elements are subject to distortion.

In the cast film die process, of which U.S. Pat. No. 4,515,647 is an example, the resin or plastic extrudate is injected into a die, typically of the "coat hanger" type, which is well known to those in the art. Within the die, the extrudate spreads laterally across the die into a uniform stream where it exits the die lip as a thin film. Where the closure elements are formed simultaneously with the film, the same plastic extrudate used to form the film may also be used to form the closure elements. A disadvantage of this method is that the position of the profiles for the closure elements with respect to the mainstream film cannot be adjusted.

Alternatively, separate die blocks for the closure elements may be used, as in U.S. Pat. No. 4,263,079. In this arrangement, the closure elements are joined to the film immediately after each element exits its respective die lip and while it is still in a fusible state. A disadvantage with this method is that separate and additional equipment is necessary.

The present invention provides for extruding the closure elements integrally with the plastic film using a cast film die having a removable lower die lip with an upper surface having one or more slots in the shape of closure elements. Additionally, the die is provided with an adjustable choker bar so that films of varying thicknesses having closure elements in variable positions can be produced.

SUMMARY OF THE INVENTION

The invention provides a cast film die for integrally extruding closure elements with a plastic film. The die has a lower lip with one or more grooves in the shape of closure elements formed in the top surface of the lip and extending from the face towards the rear of the lip. The die is a coat hanger type with an adjustable choker bar extending laterally across the coat hanger channel to adjust the flow of resin extrudate to the die lip. In addition, the choker bar allows a greater quantity of extrudate to flow to the grooves for the closure elements. Thus, a film can be made where the closure elements are integral with the film when the film exits the die lip.

In another embodiment, a co-extrusion feed block can be coupled to a multi-manifold die to produce multi-layer films with integral closure elements.

BRIEF DESCRIPTION OF THE DRAWINGS

The advantages of the present invention will become apparent upon reading the following detailed description and upon reference to the accompanying drawings, in which:

FIG. 5 is a cross-section of the top of the lower die lip;

FIG. 6 is a cross-section of the front of the lower die lip;

FIG. 7 is an enlarged view of the groove for one of the closure elements of FIGS. 5 and 6;

FIG. 8 is an enlarged view of the groove for another closure element of FIGS. 5 and 6;

FIG. 13 is a perspective view of two plates used to form the co-extrusion feed block of FIG. 11;

Figure 1:
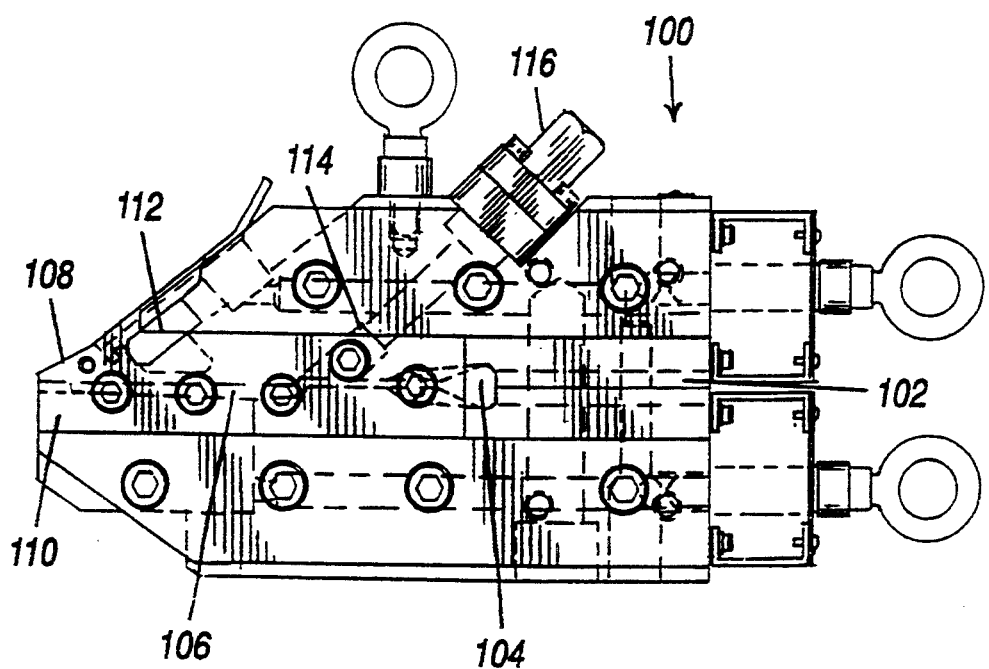
FIG. 1 is a cross-section view of the side of a die of the preferred embodiment of the invention.
Figure 2:
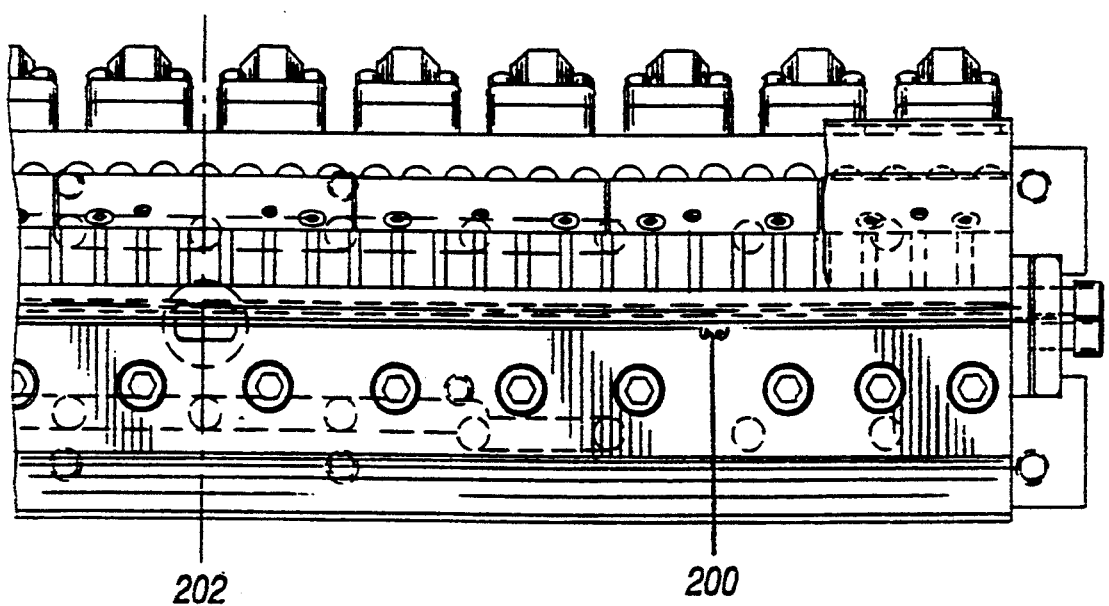
FIG. 2 is a front plan view of the die of FIG. 1.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENTS

Figure 3:
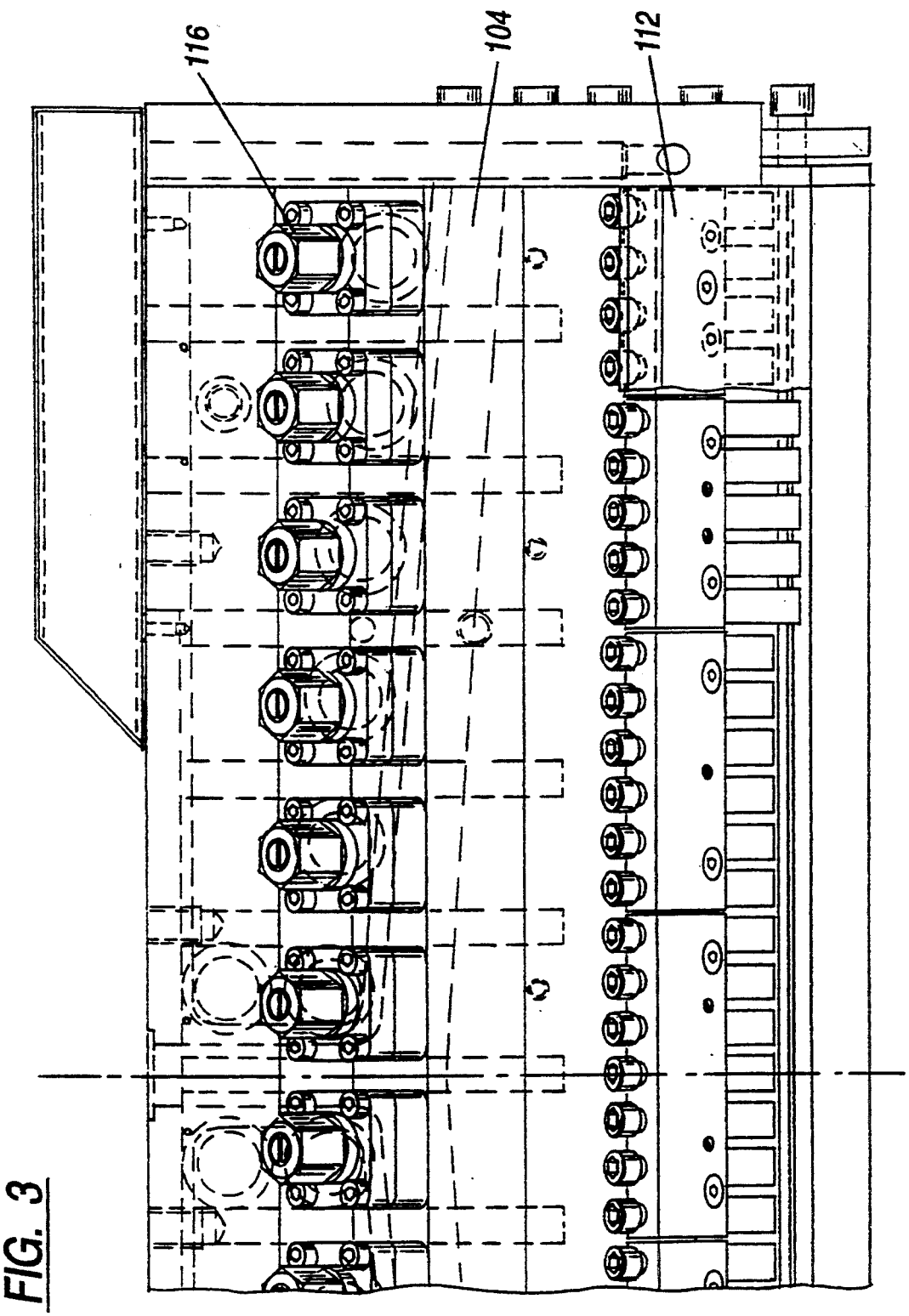
FIG. 3 is a cross-section view of a portion of the top of the die of FIG. 1.
Figure 4:
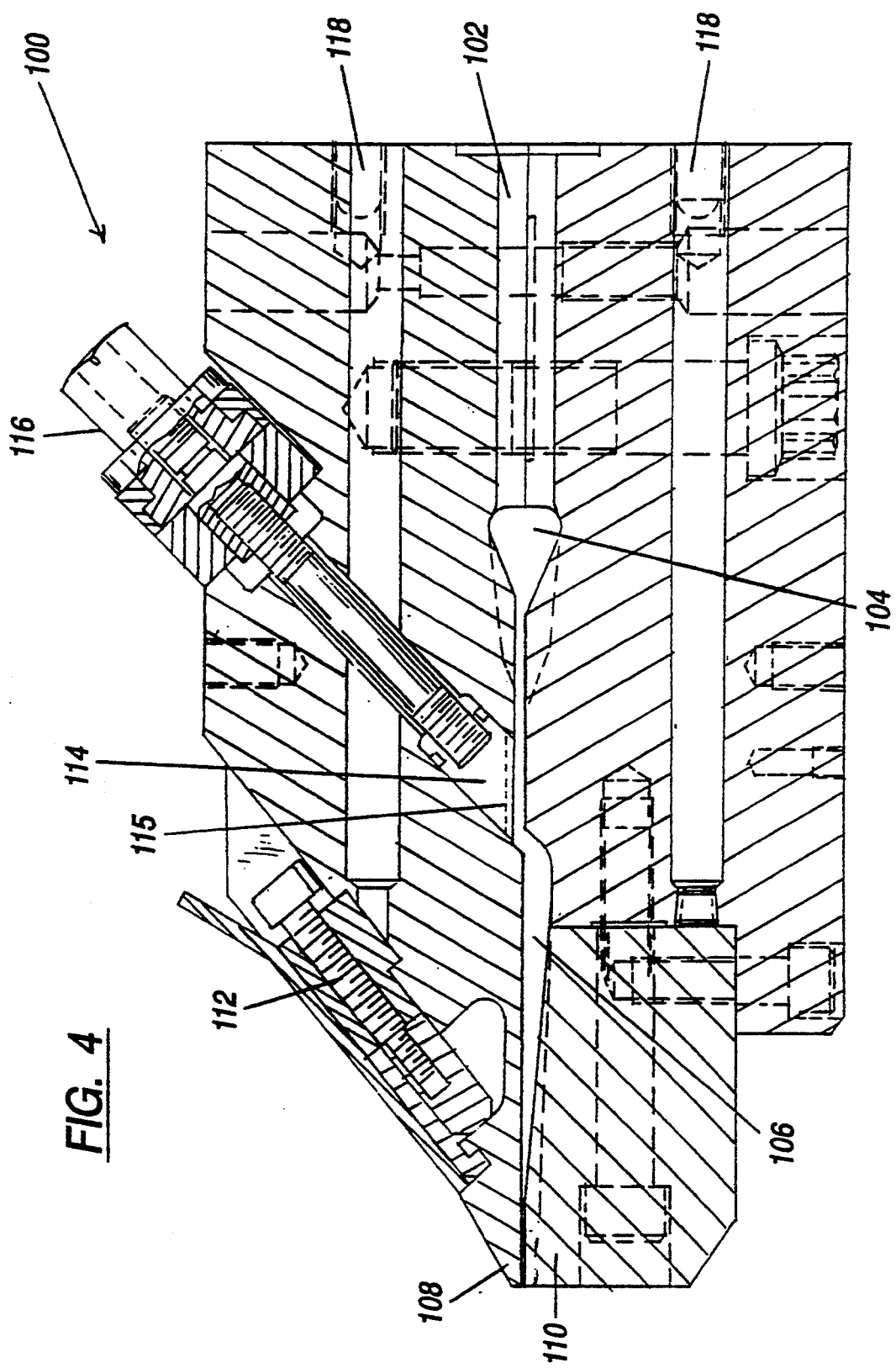
FIG. 4 is an enlarged cross-section view of the side of the die of FIG. 1.

FIG. 1 and FIG. 4 illustrate a die 100 used in the cast film die process of the invention having a rear channel 102 where the plastic, resin or extrudate is injected from an extrusion apparatus (not shown). The extrudate is maintained in a fluid state by heater elements 118 extending into the die from the rear. The extrudate flows through the rear channel 102 to the manifold 104, best seen in FIG. 3, where it spreads out laterally across the die, filling the die. Then it flows under a choker bar 114 and into slot 106 where it becomes thinned before it passes through a space defined by an upper die lip 108 and a lower die lip 110 to be taken up by a chill roll or water bath in the conventional manner. If a water bath is used, the water is then stripped by conventional means. Thereafter, the film is folded, the closure elements are mated, and the film is sealed at bag side seams and divided into individual bags.

The upper die lip 108 has a lower surface that is substantially flat. The lower die lip 110 has an upper surface that is substantially flat except for grooves, 200, 202 formed in the upper surface for extrusion of complementary closure elements, as shown in FIGS. 5 and 6. Thus, the extrudate, as it flows from the manifold 104 and through slot 106, will fill the grooves 200 and 202 in the lower die lip 110 so that closure elements integral with the film are formed within the die. In slot 106 additional cavities/reservoirs (not shown) can be included to support the flow through grooves 200 and 202.

In a preferred embodiment, the lower die lip 110 is removable so that alternative die lips having grooves 200, 202 for the closure elements which are located in a different position, or having a different configuration, can be used. FIGS. 7 and 8 show greatly enlarged views of the grooves 200 and 202, respectively. Of course, other shapes and configurations of the closure elements may be used.

The die 100 is also provided with an upper lip adjusting screw 112 for the upper die lip 108. The lip adjusting screw 112 is used to vary the space between the upper die lip 108 and the lower die lip 110 so that the thickness of the film exiting the die can be varied.

In addition, a choker bar 114, as best seen in FIG. 4, protrudes downward and extends laterally across the manifold 104. The choker bar 114 can be raised and lowered by a series of adjusting screws 116. In this way, the choker bar 114 controls the amount of extrudate passing under it causing the extrudate to evenly spread across the manifold 104. It will be appreciated that when the choker bar 114 is fully lowered, the flow of extrudate will be completely stopped. In an alternative embodiment, the choker bar 114 will have gaps 115 formed at a position corresponding to the location of the grooves 200, 202 so that more extrudate will flow to the grooves.

Figure 9:
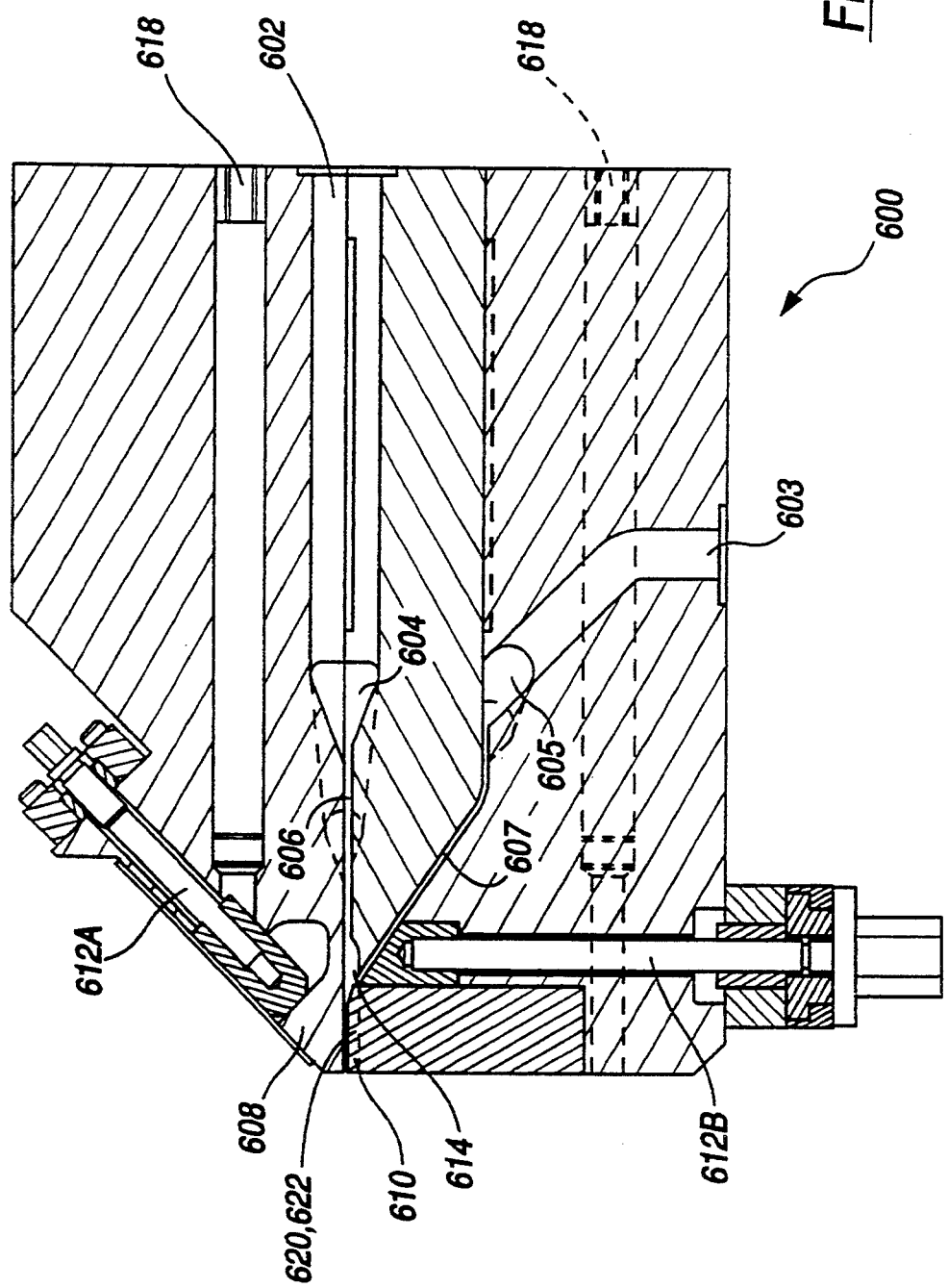
FIG. 9 is an enlarged cross-section view of the side of a multi-manifold die.
Figure 10:
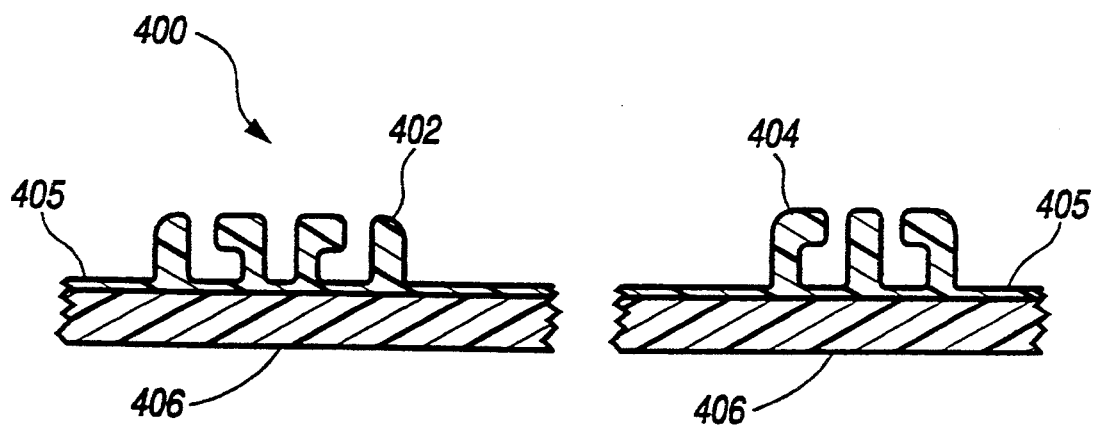
FIG. 10 shows a cross-section of a film with integrally formed closure elements of a different extrudate, according to an illustrative embodiment of this invention.

According to a feature of the present invention, the die arrangement disclosed herein is adapted to accommodate the use of separate resins, having different characteristics, for forming the closure elements from the film used to form the reclosable bags. For instance, as shown in FIG. 9, a separate resin can be fed into the extrusion die just upstream from die grooves 620, 622 (comparable to the die grooves 200 and 202) by using a multi-manifold die 600 having a pair of slots 606 and 607 through which the resins may be co-extruded without being mixed together. The product resulting from such an arrangement is shown in FIG. 10. The product 400 shown therein includes closure elements 402 and 404 and a base layer 405 made out of a separate resin having different characteristics than the resin used to form a film 406.

In forming such a product from the multi-manifold die 600 of FIG. 9, the first resin, which is used to form the film 406, is injected into a first channel 602. The first resin flows through the first channel 602 to a first manifold 604, and is then laminally extruded through a first slot 606 in the multi-manifold die 600. Simultaneously, a second resin, which is used to form the closure elements 402 and 404 and the base layer 405, is injected into a second channel 603. The second resin flows through the second channel 603 to a second manifold 605, and is then laminally extruded through a second slot 607 in the die 600 by being fed upstream of the die grooves 620 and 622 at a feeding junction 614. The first and second resins, which combine at the feeding junction 614, subsequently pass through a space defined by an upper die lip 608 and a lower die lip 610. The first resin forms the film 406, while the second resin fills the die grooves 620 and 622 to form the closure elements 402 and 404. In addition, the second resin flows outside the die grooves to form the base layer 405. The resulting product is as depicted in FIG. 10.

Like the die 100 of FIGS. 1 and 4, the multi-manifold die 600 includes heater elements 618, extending into the die 600 from the rear, for maintaining the first and second resins in a fluid state. In addition, the die 600 is provided with an upper lip adjusting screw 612A for varying the space between the upper die lip 608 and the lower die lip 610 so that the thickness of the film exiting the die 600 can be varied. Moreover, the die 600 is provided with a choker bar 612B for varying the thickness of a downstream portion of the second slot 607. This allows one to vary the thickness of the second resin passing into the space between the upper die lip 608 and the lower die lip 610.

The above arrangement is particularly advantageous where it is desired to form a reclosable bag having more than one film layer, with resulting film walls having special properties such as physical strength, ability to be colored and imprinted, etc. In particular, one type of resin which is particularly suited for profile extrusion (such as a particular grade of polyethylene) can be used to form the closure elements along with a first inside layer of film. At the same time, a different resin (such as nylon), which is particularly selected for special properties such as physical strength and barrier properties, can be used to form one or more additional layers of film having the requisite properties. Alternatively, a resin having the capability of being imprinted or colored, may also be used for the additional layers.

Figure 11:
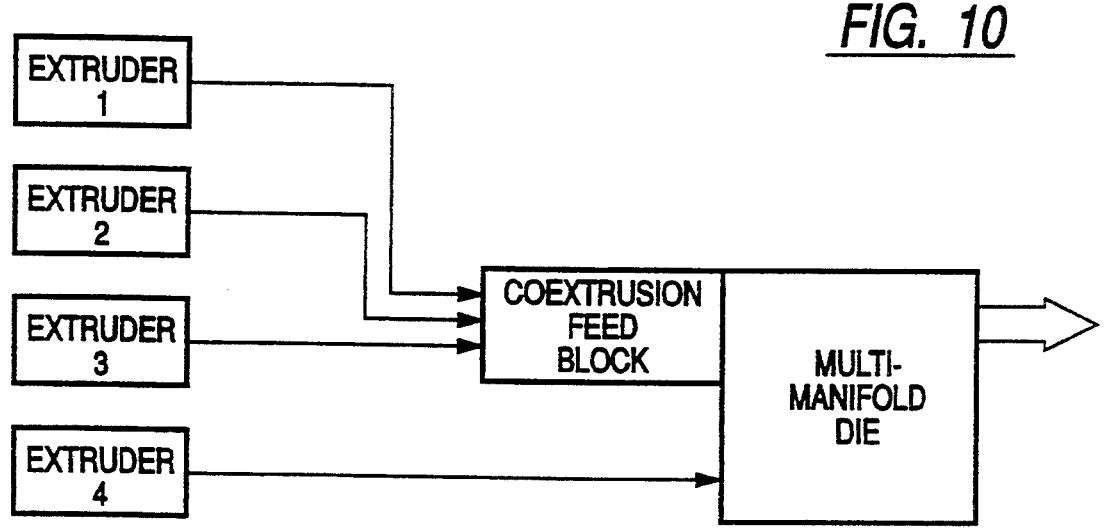
FIG. 11 is a schematic view of a co-extrusion feed block coupled with a multi-manifold die, the co-extrusion feed block being fed by three extruders.

According to a preferred arrangement, depicted by the schematic diagram in FIG. 11, the additional layers of film are best formed by injecting the desired resins into corresponding slots of a co-extrusion feed block. After exiting the co-extrusion feed block in a three-layered laminar flow, the flow is injected into a multi-manifold die, such as the die 600 shown in FIG. 9, so that it can be combined with another resin used to form the closure elements and the first inside layer of film.

Figure 12:
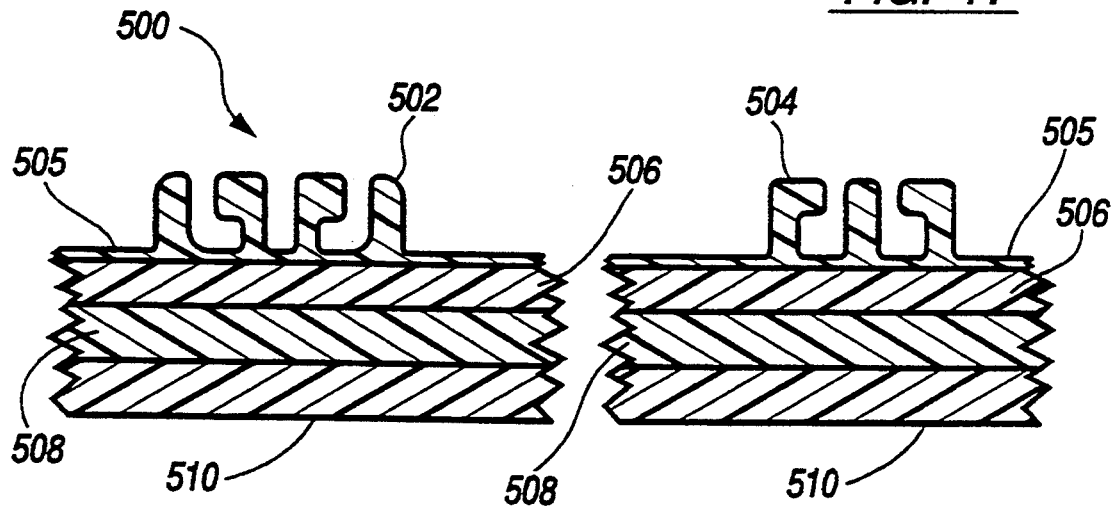
FIG. 12 shows a cross-section of a multi-layer film with integrally formed closure elements of a different extrudate, according to a further embodiment of the present invention.

The product 500 realized from such a process is illustrated in FIG. 12. As shown therein, the closure elements 502, 504, as well as the inside layer of film 505, are all formed of the same resin. With respect to the arrangement of FIG. 11, the closure elements 502, 504 and the associated web or inside film layer 505 are formed using extruder 4 which is linked directly to the multi-manifold die through a separate plenum or manifold (not shown). At the same time, additional layers of film 506, 08, 510, etc. may also be formed as required. These film layers are formed by using corresponding extruders (extruders 1, 2, and 3 in FIG. 11) which operate through the co-extrusion feed block in conjunction with the multi-manifold die. The arrangement, thus, provides the additional film layers formed of desired resins to realize a bag having multiple film layers.

FIG. 13 illustrates a co-extrusion feed block 700 which can be used to form the outer layers of film 506, 508, and 510. The co-extrusion feed block 700 is formed from two plates 720, 722 which are attached to each other using an attaching means such as screws or bolts. A first resin, which is used to form the film layer 506, is injected into a first channel 702 and is laminally extruded through a first slot 704 in the feed block 700. Simultaneously, a second resin, which is used to form the film layer 508, is injected into a second channel 706 and is laminally extruded through a second slot 708; and a third resin, which is used to form the film layer 510, is injected into a third channel 710 and is laminally extruded through a third slot 712. The three slots 704, 708, and 712 meet near the front of the feed block 700 and the three resins exit the block at a rectangularly-shaped output port 714 in a three-layered laminar flow. In the illustrated embodiment, the second channel 706, the second slot 708, and the output port 714 are formed from the adjoining of the two plates 720, 722.

The laminar flow, which forms the outer film layers 506, 508, and 510, is then fed directly into the first channel 602 of the multi-manifold 600 shown in FIG. 9. Next, the laminar flow is spread out by the manifold 604 and is laminally extruded through the first slot 606. The first slot 606 keeps the laminar flow uniform in thickness and guarantees uniform flow velocity. Simultaneously, a fourth resin, which is used to form the inner film layer 505 and the closure elements 502, 504, is fed into the second channel 603 and laminally extruded through the second slot 606. The choker bar 612B is adjusted so that the fourth resin is thick enough to form both the inner film layer 505 and the closure elements 502, 504.

The fourth resin combines with the first, second, and third resins at the feeding junction 614 to form a four-layered laminar flow, and the laminar flow then passes through the space between the upper die lip 608 and the lower die lip 610. The upper lip screw 612A is adjusted so that the space is sufficient for the laminar flow to pass therethrough without being distorted. In connection with the resulting product 500 in FIG. 12, the first, second, and third resins form the film layers 506, 508, 510, a part of the fourth resin forms the inner base layer 505, and another part of the fourth resin fills the die grooves 620, 622 to form the closure elements 502, 504.

Figure 14:
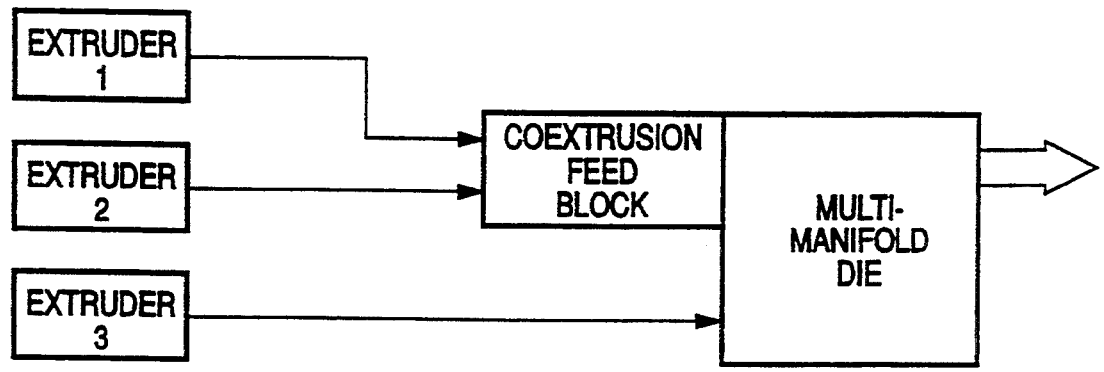
FIG. 14 is a schematic view of a co-extrusion feed block coupled with a multi-manifold die, the co-extrusion feed block being fed by two extruders.
Figure 15:
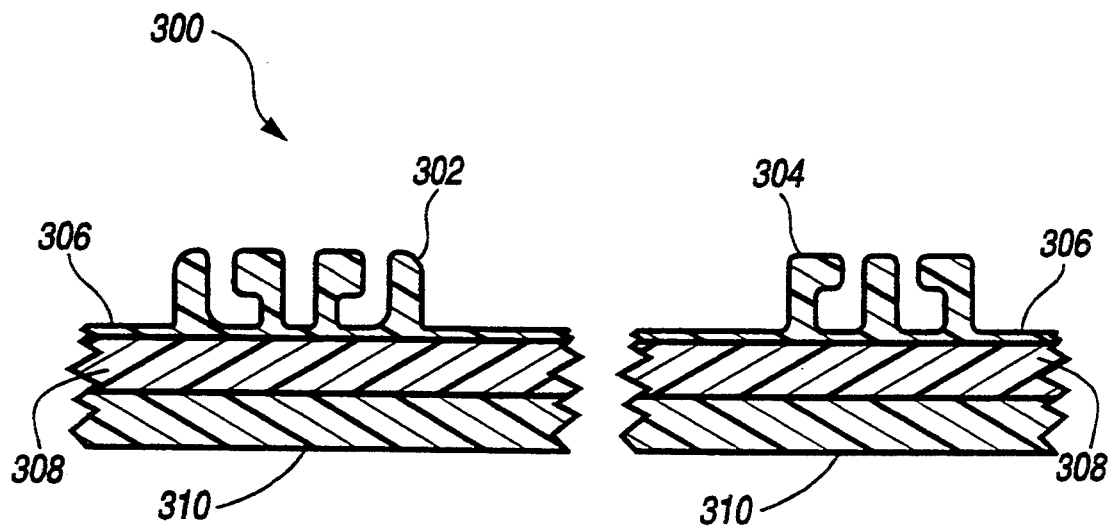
FIG. 15 shows a cross-section of a multi-layer film with integrally formed closure elements, according to an alternative embodiment of this invention.

In an alternative embodiment, an arrangement shown by the schematic diagram in FIG. 14 is used to produce a multiple layer film product 300 shown in FIG. 15. The product 300 in FIG. 15 differs from the product 500 in FIG. 12 in that the product 300 is composed of three film layers 306, 308, and 310 while the product 500 is composed of four film layers 505, 506, 508, and 510. Once again, resins for forming the film layers 306, 308, and 310 may be chosen to give these film layers special properties. With respect to the arrangement of FIG. 14, the closure elements 302, 304 and the base film layer 306 are formed using extruder 3, which is linked directly to the multi-manifold die through a separate plenum or manifold (not shown). At the same time, additional layers of film 308, 310, etc. may also be formed as required.

These additional film layers are formed by using corresponding extruders (extruders 1 and 2 in FIG. 14) which operate through a co-extrusion feed block in conjunction with the multi-manifold die. To accommodate the two extruders, the co-extrusion feed block is constructed with two channels for receiving two separate resins. The construction of a co-extrusion feed block having two channels/slots is similar to the feed block shown in FIG. 13, except that it includes two channels/slots instead of three channels/slots. The two resins are laminally extruded through two separate slots in the feed block, the slots intersecting near an output face of the feed block. The two resins exit an output port of the feed block in a two-layered laminar flow.

The laminar flow, which forms the film layers 308 and 310, is then fed directly into the first channel 602 of the multi-manifold 600 shown in FIG. 9 and laminally extruded through the first slot 606. Simultaneously, a third resin, which is used to form the closure elements 302, 304 and the base layer 306, is fed into the second channel 603 and laminally extruded through the second slot 606. The choker bar 612B may be adjusted to vary the thickness of the third resin flow and, in turn, vary the thickness of the base film layer 306.

The third resin combines with the other two resins at the feeding junction 614 to form a three-layered laminar flow, and the laminar flow then passes through the space between the upper die lip 608 and the lower die lip 610. In connection with the resulting product 300 in FIG. 15, part of the third resin fills the die grooves 620, 622 to form the closure elements 302, 304, another part of the third resin forms the base layer 306, and the other two resins form the two film layers 308 and 310.

In the embodiment of FIGS. 14 and 15, the film layers 308, 310 are produced by use of a co-extrusion feed block which feeds a two-layered laminar flow into one channel of the multi-manifold die 600. Alternatively, the multiple layer film product shown in FIG. 15 may be produced without using a co-extrusion feed block. Instead, the multi-manifold die 600 shown in FIG. 9 is modified to include an additional entrance channel and corresponding manifold and slot. In this alternative embodiment, the product 300 in FIG. 15 is realized by injecting a separate resin into each channel of the modified multi-manifold die, and laminally extruding each separate resin through separate manifolds and slots in the die. The resin injected into the additional channel is used to form one of the layers 308, 310, while a separate resin injected into another channel is used to form the other of the layers 308, 310. Unlike the embodiment employing the co-extrusion feed block, the resins for forming the layers 308, 310 are fed through separate channels of the modified multi-manifold die. Finally, a third resin injected into a third channel is used to form the closure elements 302, 304 and the base layer 306.

It will be understood that in each of the embodiments described above, where only one closure element is to be formed, the lower die lip has only one groove formed in the upper surface for extrusion of a closure element. In such a case, a film having a complementary closure element is produced to be mated with a film having a corresponding complementary closure element. According to one embodiment of the invention, the closure elements are positioned about 1.0 inch apart and about half-way between the outer edges of the lower die lip. Thereafter, the film is sealed at the bottom and at side seams to form enclosures having closure elements in the interior. The bag material is then separated into individual bags. By positioning the closure elements as described above, a pilfer-proof web extends between the closure elements and yields a bag which is resistant to product tampering.

It should, of course, be understood that a wide range of changes and modifications can be made to the preferred embodiment described above. For example, two separate films, each containing only one closure element, could also be made by the processes of the present invention. These two films would then need to be joined on the bottom as well as the sides as each individual bag is formed. It is, therefore, intended that the foregoing detailed description be regarded as illustrative rather than limiting, and that it be understood that it is the following claims, including all equivalents, which are intended to define the scope of this invention.

What is claimed is:

1. A method for forming a plastic film with at least one integral closure element, comprising:

providing a die having a rear channel, a manifold connected to the rear channel and disposed downstream of the rear channel, and a slot connected to the manifold and disposed downstream of the manifold, the manifold and the slot extending laterally across the die, a choker bar protruding into the manifold and extending laterally across the manifold, an upper die lip having a substantially flat lower surface and extending laterally across the die, and a lower die lip, extending laterally across the die, having a substantially flat upper surface facing the lower surface of the upper die lip and at least one groove formed in the upper surface, the groove being in the shape of a closure element, wherein a surface of the choker bar adjacent the manifold has at least one gap located at a lateral position corresponding to the location of the at least one groove, so that more extrudate flows to the at least one groove, and wherein the slot extends to an extrusion orifice formed between the upper die lip and the lower die lip;

injecting plastic into the rear channel of the die;

spreading the plastic evenly and laterally across the manifold in the die with the choker bar;

thinning the plastic in the slot provided in the die downstream of the manifold;

shaping the flow of plastic as it flows under the choker bar with the at least one gap in the choker bar; and extruding the plastic into a film through the extrusion orifice, at least one closure element being extruded through the at least one groove formed in the upper surface of the lower die lip so that the closure element is joined with the film before the film leaves the die lips.

2. The method of claim 1 wherein two complementary closure elements are extruded through two grooves formed in the upper surface of the lower die lip so that the closure elements are joined with the film before the film leaves the die lips.

3. The method of claim 1 further comprising providing an adjusting screw, coupled to one of the die lips, to vary the space formed between the upper die lip and the lower die lip.

4. A method for forming a multi-layer plastic film with at least one closure element integral to one surface of the film, comprising:

providing a die having a first entrance channel for receiving a first plastic, a first manifold connected to the first entrance channel and disposed downstream of the first entrance channel, a first slot connected to the first manifold and disposed downstream of the first manifold, the first manifold and the first slot extending laterally across the die, a second entrance channel for receiving a second plastic, a second manifold connected to the second entrance channel and disposed downstream of the second entrance channel, a second slot connected to the second manifold and disposed downstream of the second manifold, the second manifold and the second slot extending laterally across the die, a choker bar protruding into the second slot and extending laterally across the second slot, an upper die lip having a substantially flat lower surface and extending laterally across the die, and a lower die lip, extending laterally across the die, having a substantially flat upper surface facing the lower surface of the upper die lip and at least one groove formed in the upper surface, the groove being in the shape of a closure element, wherein a surface of the choker bar adjacent the second has at least one gap located at a lateral position corresponding to the location of the at least one groove, so that more extrudate flows to the at least one groove, and wherein the first and second slots extend to an extrusion orifice formed between the upper die lip and the lower die lip;

injecting the first plastic into the first entrance channel of the die;

flowing the first plastic through the first manifold in the die;

thinning the first plastic in the first slot provided in the die downstream of the first manifold;

injecting the second plastic into the second entrance channel of the die;

flowing the second plastic through the second manifold in the die;

thinning the second plastic in the second slot provided in the die downstream of the second manifold;

shaping the flow of the second plastic as it flows under the choker bar with the at least one gap in the choker bar;

extruding a film having at least two layers through the die lips; and extruding at least one closure element through the at least one groove formed in the upper surface of the lower die lip so that the closure element is joined with one surface of one layer of film before the multi-layer film leaves the die lips.

5. The method of claim 4 wherein two complementary closure elements are extruded through two grooves formed in the upper surface of the lower die lip so that the closure elements are joined with one surface of one layer of film before the multi-layer film leaves the die lips.

6. The method of claim 4 further comprising providing an adjusting screw, coupled to one of the die lips, to vary the space formed between the upper die lip and the lower die lip.

7. The method of claim 4 wherein the injecting the first plastic into the first entrance channel of the die comprises injecting a plurality of plastics to a co-extrusion feed block and feeding the plurality of plastics, in laminar flow, to the first entrance channel of the die.

* * * * *